United States Patent [19]

Hoshiba et al.

[11] Patent Number: 4,699,098
[45] Date of Patent: Oct. 13, 1987

[54] CRANKSHAFT FOR AN INTERNAL COMBUSTION ENGINE WITH MULTIPLE CYLINDERS

[75] Inventors: Akihiko Hoshiba; Hiroaki Fujimoto, both of Hamamatsu, Japan

[73] Assignee: Sanshin Kogyo Kabushiki Kaisha, Hamamatsu, Japan

[21] Appl. No.: 895,745

[22] Filed: Aug. 12, 1986

[30] Foreign Application Priority Data

Aug. 12, 1985 [JP] Japan .................................. 60-175729

[51] Int. Cl.[4] ............................................. F02B 75/06
[52] U.S. Cl. ................................... 123/192 B; 74/604
[58] Field of Search ............... 123/192 B; 74/603, 604

[56] References Cited

U.S. PATENT DOCUMENTS

| 2,013,163 | 9/1935 | Meyer | 123/192 B |
| 2,666,420 | 1/1954 | Teisen | 123/192 B |
| 3,106,195 | 10/1963 | Hanley | 123/192 B |
| 3,402,707 | 9/1968 | Heron | 123/192 B |
| 3,528,319 | 9/1970 | Ishida | 123/192 B |
| 4,538,481 | 9/1985 | Ohta et al. | 123/192 B |
| 4,570,586 | 2/1986 | Roe | 123/192 B |
| 4,632,072 | 12/1986 | Brogdon | 123/192 B |

*Primary Examiner*—Charles J. Myhre
*Assistant Examiner*—David A. Okonsky
*Attorney, Agent, or Firm*—Ernest A. Beutler

[57] ABSTRACT

An improved lightweight and strong flywheel for a reciprocating machine having multiple cylinders. The crankshaft includes a plurality of journals offset from the axis of rotation of the crankshaft. At least one of these journals is connected to the crankshaft by means of a flywheel.

4 Claims, 4 Drawing Figures

CRANKSHAFT FOR AN INTERNAL COMBUSTION ENGINE WITH MULTIPLE CYLINDERS

BACKGROUND OF THE INVENTION

This invention relates to a crankshaft for a multi-cylinder engine and more particularly to a crankshaft construction having high strength and light weight.

It is well known that a crankshaft has a certain resonant frequency and it is desirable to design a crankshaft so that this resonant frequency does not fall within a range where it will be excited during the normal engine running speed. The resonant frequency of a crankshaft may be expressed by the following equation:

$$F = \frac{1}{2\pi} \sqrt{\frac{K}{I}}$$

wherein:
F=the resonant frequency,
K=the spring constant of the crankshaft, and
I=the inertial mass of the crankshaft.

The resonant frequency is related to the resonant crankshaft angular velocity by the following formula:

$$f = 1/2\pi\omega$$

wherein $\omega$=the resonant crankshaft angular speed.

Therefore, the resonant crankshaft angular speed may be expressed by the following equation:

$$\omega = \sqrt{\frac{K}{I}}$$

In order to make the crankshaft such that the resonant crankshaft angular velocity is above the normal speeds encountered by the associated engine, it is necessary to either make the spring constant very large or the inertial mass very small. Making a large spring constant requires the use of a very massive crankshaft. Such massive crankshafts are, however, undesirable because they take up large space and can cause the overall engine to become unduly large. On the other hand, a substantial reduction in the inertial mass means that either the crankshaft and/or its associated flywheel become unduly light. If the flywheel is too light, then it will not serve its purpose in providing smooth running and damping of the irregular firing impulses. On the other hand, if an attempt is made to reduce the resonant crankshaft angular velocity to a speed below the normal engine speeds, either the spring constant K must be substantially reduced or the inertial mass I must be made very large. If the spring constant is made very small, then the crankshaft tends to become too weak. On the other hand, if the inertial mass I is increased substantially, the mass of the flywheel adversely affects engine performance.

It is, therefore, a principal object of this invention to provide an improved crankshaft construction for a multiple cylinder internal combustion engine.

It is a further object of this invention to provide a crankshaft construction for a multiple cylinder internal combustion engine wherein the resonant frequency of the crankshaft lies outside of the normal engine running speeds and wherein the mass of the flywheel is kept at reasonable limits and the crankshaft itself may have the appropriate strength but not be unduly heavy.

SUMMARY OF THE INVENTION

This invention is adapted to be embodied in a crankshaft for a multiple cylinder, reciprocating machine which is rotatable about an axis of rotation. The crankshaft has a plurality of journals each offset from the axis of rotation and which are adapted to receive an end of a connecting rod to establish a driving connection with a respective piston. A flywheel is affixed for rotation with one end of the crankshaft and means comprising a further flywheel connect at least one of the journals to the remainder of the crankshaft.

DETAILED DESCRIPTION OF THE PREFERRED EMBODIMENT

Figure 1:
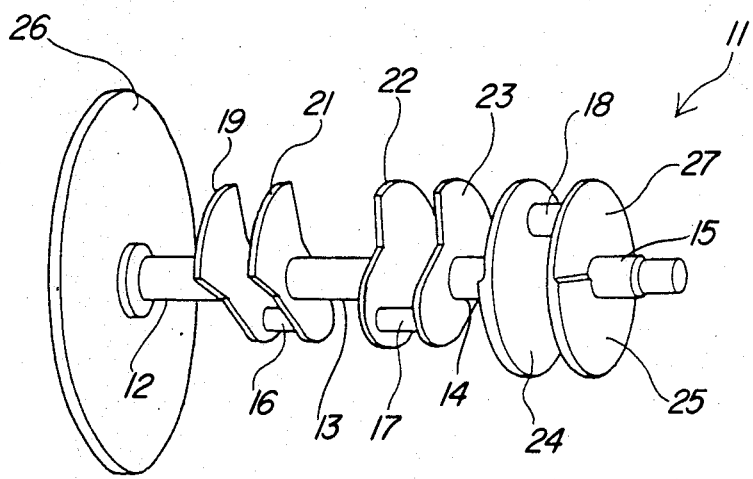
FIG. 1 is a perspective view of a crankshaft for a multiple cylinder internal combustion engine constructed in accordance with an embodiment of the invention.
Figure 2:
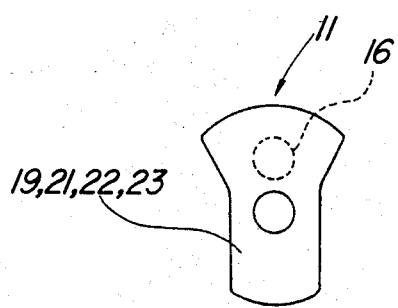
FIG. 2 is an end elevational view of one of the conventional counterweights of the crankshaft.
Figure 3:
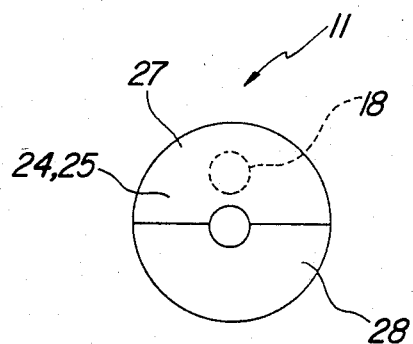
FIG. 3 is an end elevational view of the counterweights embodying an integral flywheel constructed in accordance with an embodiment of the invention.

Referring now in detail to the drawings, a crankshaft constructed in accordance with an embodiment of the invention is identified generally by the reference numeral 11. The crankshaft 11 is adapted to be employed in conjunction with a multiple cylinder internal combustion engine. It is to be understood, however, that the principle of this invention may be employed with crankshafts for other types of reciprocating machines.

The crankshaft 11 has a plurality of spaced main bearing portions 12, 13, 14 and 15. The main bearing portions 12, 13, 14 and 15 are employed for rotatably journaling the crankshaft 11 for rotation about an axis, as is well known in this art. A plurality of offset journals 16, 17, and 18 are connected to the bearing portions 12, 13, 14 and 15 integrally by means of respective pairs of throws 19 and 21, 22 and 23, and 24 and 25. It should be noted that the illustrated crankshaft 11 is designed so as to operate in conjunction with either a three or a six cylinder type of engine wherein the offset journals 16, 17 and 18 are adapted to receive the big ends of connecting rods (not shown) for drivingly connecting the crankshaft 11 to associated pistons. Although the invention is described in conjunction with a three or six cylinder engine, it is to be understood that the invention may be equally as well practiced with multiple cylinder engines having other numbers of cylinders.

The pairs of throws 19, 21 and 22, 23 are conventional and are counterweighted so as to balance the reciprocating mass of the associated connected rods and pistons. This form of balancing is well known and it is believed unnecessary to describe it in further detail. Furthermore, a flywheel 26 is affixed to one end of the crankshaft 11 for known purposes.

In accordance with the invention, the throws 24 and 25 which connect the journal 18 to the main bearing portions 14 and 15 and most remotely positioned from the end of the crankshaft 11 to which the flywheel 26 is formed constitute, in effect, a pair of flywheels. These flywheels 24, 25, have a main generally cylindrical portion 27 that acts to provide an inertial mass and a counterweighted portion 28 which serves the purpose of balancing for the reciprocating mass of the piston and connected rod associated with the journal 18.

Figure 4:
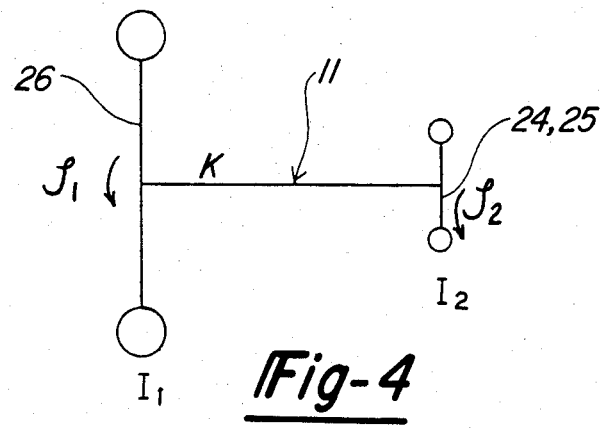
FIG. 4 is a diagramatic view of the invention.

The principle of the invention may be understood by reference to diagramatic FIG. 4. In FIG. 4, the inertial mass of the flywheel 26 is identified by the character $I_1$ and the inertial mass of the flywheel pair 24, 25, is indicated as $I_2$. The torsional spring constant of the flywheel is identified as K and the angular displacement or torsional angles of the respective inertial masses $I_1$ and $I_2$ are indicated as $\rho_1$ and $\rho_2$. The following relationships hold true:

$$I_1 \ddot{\rho}_1 = K(\rho_2 - \rho_1)$$

$$I_2 \ddot{\rho}_2 = K(\rho_1 - \rho_2)$$

The following relationship also holds true:

$$\rho_1 = \theta_1 \cos(\omega t + c)$$

$$\rho_2 = \theta_2 \cos(\omega t + c)$$

wherein: $\theta_1$ and $\theta_2$ = amplitude of vibration.

Therefore, solving equations A and B, we obtain $$I_1 \theta_1 \omega^2 = K(\theta_1 - \theta_2)$$

$$I_2 \theta_2 \omega^2 = K(\theta_2 - \theta_1)$$

Therefore, the resonant crankshaft angular velocity may be expressed as follows:

$$\omega = \sqrt{K \frac{I_1 + I_2}{I_1 I_2}}$$

From the foregoing, it should be readily apparent that the crankshaft may be made relatively light in weight and yet the resonant angularly velocity may be kept small since the product of the inertial masses is obviously much larger than their sum and, thus, it is possible to achieve the result without having a large or massive flywheel and/or lightweight crankshaft.

It should be readily apparent from the foregoing description that the invention is well suited to achieve its desired results. Also, although an embodiment of the invention has been illustrated and described, various changes and modifications may be made without departing from the spirit and scope of the invention, as defined by the appended claims.

We claim:

1. A crankshaft for a reciprocating machine and rotatable about an axis of rotation, said crankshaft having a plurality of journals each offset from said axis of rotation and adapted to receive an end of a connecting rod to establish a driving connection with a respective piston, a flywheel affixed for rotation with said crankshaft, and means comprising a further flywheel for connecting at least one of said journals to the remainder of said crankshaft.

2. A crankshaft as set forth in claim 1 wherein the further flywheel connects the journal most remotely positioned from the first mentioned flywheel.

3. A crankshaft as set forth in claim 1 wherein the further flywheel comprises a pair of annular shaped elements having offset masses for balancing the reciprocating mass associated with the respective journal.

4. A crankshaft as set forth in claim 3 wherein the further flywheel connects the journal most remotely positioned from the first mentioned flywheel.

* * * * *